US012811859B2

(12) United States Patent
Feki et al.

(10) Patent No.: US 12,811,859 B2
(45) Date of Patent: Nov. 24, 2026

(54) DATA AUGMENTATION FOR MACHINE LEARNING TRAINING IN POSITIONING

(71) Applicant: Nokia Technologies Oy, Espoo (FI)

(72) Inventors: Afef Feki, Massy (FR); Anna Pantelidou, Massy (FR); Muhammad Ikram Ashraf, Espoo (FI); Oana-Elena Barbu, Aalborg (DK); Athul Prasad, Naperville, IL (US); Diomidis Michalopoulos, Munich (DE); Dick Carrillo Melgarejo, Espoo (FI); Mikko Säily, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/102,744

(22) PCT Filed: Aug. 11, 2022

(86) PCT No.: PCT/EP2022/072598

§ 371 (c)(1),
(2) Date: Feb. 10, 2025

(87) PCT Pub. No.: WO2024/032895

PCT Pub. Date: Feb. 15, 2024

(65) Prior Publication Data

US 2026/0012399 A1 Jan. 8, 2026

(51) Int. Cl.
*G01S 5/02* (2010.01)
*H04L 41/16* (2022.01)
(Continued)

(52) U.S. Cl.
CPC ............. *H04L 41/16* (2013.01); *H04W 24/10* (2013.01); *H04W 64/00* (2013.01)

(58) Field of Classification Search
CPC ...... H04L 41/16; H04W 24/10; H04W 64/00; G01S 5/0278; G01S 5/0236
See application file for complete search history.

(56) References Cited

U.S. PATENT DOCUMENTS

2018/0025500 A1 1/2018 Nielsen et al.
2018/0115357 A1* 4/2018 Park .................... H04B 7/0417
(Continued)

FOREIGN PATENT DOCUMENTS

KR 102278699 B1 6/2021
WO 2022/129690 A1 6/2022
WO 2022/155244 A2 7/2022

OTHER PUBLICATIONS

Office action received for corresponding Japanese Patent Application No. 2025-507092, dated Dec. 1, 2025, 3 pages of office action and 5 pages of translation available.
(Continued)

*Primary Examiner* — Joseph E Dean, Jr.
(74) *Attorney, Agent, or Firm* — Lippes Mathias LLP

(57) ABSTRACT

Example embodiments of the present disclosure relate to data augmentation for training a model. In this solution, a first device receives a configuration for data augmentation from a second device. The first device determines a set of data augmentation parameters based on the configuration. The first device trains a model based on data which is obtained based on the set of data augmentation parameters. In this way, it increases amount of quality training data and enables robust model training. Moreover, it can evaluate the integrity of the augmented data set by using the probability values per data point or data segment.

20 Claims, 10 Drawing Sheets

(51) Int. Cl.
*H04W 24/10* (2009.01)
*H04W 64/00* (2009.01)

(56) References Cited

U.S. PATENT DOCUMENTS

| | | | |
|---|---|---|---|
| 2021/0160812 A1 | 5/2021 | Manolakos et al. | |
| 2021/0219099 A1 | 7/2021 | Koteshwar Srinath et al. | |
| 2022/0046386 A1* | 2/2022 | Sundararajan | G01S 5/0252 |
| 2022/0070028 A1 | 3/2022 | Yerramalli et al. | |
| 2022/0232509 A1 | 7/2022 | Barbu et al. | |
| 2023/0037704 A1* | 2/2023 | Hirzallah | H04W 64/006 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"3rd Generation Partnership Project; Technical Specification Group Radio Access Network; NR; Physical layer procedures for data (Release 17)", 3GPP TS 38.214, V17.2.0, Jun. 2022, pp. 1-229.

"3rd Generation Partnership Project; Technical Specification Group Radio Access Network; Evolved Universal Terrestrial Radio Access (E-UTRA) and NR; Study on enhancement for Data Collection for NR and EN-DC (Release 17)", 3GPP TR 37.817, V17.0.0, Apr. 2022, pp. 1-23.

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

"Final Summary of [109-e-R18-AI/ML-07] Email discussion on evaluation of AI/ML for positioning accuracy enhancement", 3GPP TSG-RAN WG1 Meeting #109-e, Tdoc R1-2205633, Agenda: 9.2.4.1, Ericsson, May 9-20, 2022, pp. 1-143.

Ding et al., "Augmentation and Evaluation of Training Data for Deep Learning", IEEE International Conference on Big Data (BIGDATA), Dec. 11-14, 2017, pp. 2603-2611.

Wang et al., "Data-Augmentation-Based Cellular Traffic Prediction in Edge-Computing-Enabled Smart City", IEEE Transactions on Industrial Informatics, vol. 17, No. 06, Jun. 2021, pp. 4179-4187.

Huang et al., "Data Augmentation for Deep Learning-Based Radio Modulation Classification", IEEE Access, vol. 08, Dec. 19, 2019, pp. 1498-1506.

Alaya-Feki et al., "Informed spectrum usage in cognitive radio networks: Interference cartography", IEEE 19th International Symposium on Personal, Indoor and Mobile Radio Communications, Sep. 15-18, 2008, 5 pages.

Sinha et al., "Data Augmentation Schemes for Deep Learning in an Indoor Positioning Application", Electronics, vol. 08, No. 05, May 17, 2019, pp. 1-19.

"IEEE 802.11", Wikipedia, Retrieved on Mar. 7, 2025, Webpage available at : https://en.wikipedia.org/wiki/IEEE_802.11.

Invitation to Pay Additional Fees received for corresponding Patent Cooperation Treaty Application No. PCT/EP2022/072598, dated Mar. 31, 2023, 10 pages.

International Search Report and Written Opinion received for corresponding Patent Cooperation Treaty Application No. PCT/EP2022/072598, dated May 24, 2023, 16 pages.

* cited by examiner

DATA AUGMENTATION FOR MACHINE LEARNING TRAINING IN POSITIONING

RELATED APPLICATION

This application claims priority to PCT Patent Application No. PCT/EP2022/072598, filed 11 Aug. 2022, which is incorporated herein by reference in its entirety.

FIELD

Various example embodiments of the present disclosure generally relate to the field of telecommunications and in particular, to methods, devices, apparatuses and computer readable storage medium for data augmentation for machine learning training in positioning.

BACKGROUND

In the telecommunication industry, technologies have been proposed to improve performance of telecommunication systems. For example, Artificial Intelligence/Machine Learning (AI/ML) models have been employed in telecommunication systems to improve the performance of telecommunications systems. Therefore, it is worthy studying on training the AI/ML models employed in a telecommunication system.

SUMMARY

In a first aspect of the present disclosure, there is provided a first device. The first device comprises at least one processor; and at least one memory storing instructions that, when executed by the at least one processor, cause the first device at least to perform: receiving, from a second device, a configuration of data augmentation for training a positioning model at the first device; determining a set of data augmentation parameters based on the configuration of data augmentation; obtaining data based on a data augmentation procedure and the set of data augmentation parameters, the data comprising measured data of the first device and augmented data; and training the positioning model based on a combination of the measured data and the augmented data.

In a second aspect of the present disclosure, there is provided a second device. The second device comprises at least one processor; and at least one memory storing instructions that, when executed by the at least one processor, cause the second device at least to perform: receiving a radio measurement from at least one third device; determining a configuration of data augmentation for training a positioning model at the first device based on the measurement from the at least one third device; and transmitting, to a first device, the configuration of data augmentation.

In a third aspect of the present disclosure, there is provided a first device. The first device comprises at least one processor; and at least one memory storing instructions that, when executed by the at least one processor, cause the first device at least to perform: transmitting to a second device an assistance request for data augmentation; receiving from the second device augmented data for training a positioning model; and training the positioning model based on a combination of the augmented data and measured data.

In a fourth aspect of the present disclosure, there is provided a second device. The second device comprises at least one processor; and at least one memory storing instructions that, when executed by the at least one processor, cause the second device at least to perform: receiving from a first device an assistance request for data augmentation; obtaining measurement data from a third device; generating augmented data for training a positioning model at the first device based on the measurement data; and transmitting the augmented data to the first device.

In a fifth aspect of the present disclosure, there is provided a method. The method comprises: receiving, from a second device, a configuration of data augmentation for training a positioning model at the first device; determining a set of data augmentation parameters based on the configuration of data augmentation; obtaining data based on a data augmentation procedure and the set of data augmentation parameters, the data comprising measured data of the first device and augmented data; and training the positioning model based on a combination of the measured data and the augmented data.

In a sixth aspect of the present disclosure, there is provided a method. The method comprises: receiving a radio measurement from at least one third device; determining a configuration of data augmentation for training a positioning model at the first device based on the measurement from the at least one third device; and transmitting, to a first device, the configuration of data augmentation.

In a seventh aspect of the present disclosure, there is provided a method. The method comprises: transmitting to a second device an assistance request for data augmentation; receiving from the second device augmented data for training a positioning model; and training the positioning model based on a combination of the augmented data and measured data.

In an eighth aspect of the present disclosure, there is provided a method. The method comprises: receiving from a first device an assistance request for data augmentation; obtaining measurement data from a third device; generating augmented data for training a positioning model at the first device based on the measurement data; and transmitting the augmented data to the first device.

In a ninth aspect of the present disclosure, there is provided an apparatus. The apparatus comprises: means for receiving, from a second device, a configuration of data augmentation for training a positioning model at the first device; means for determining a set of data augmentation parameters based on the configuration of data augmentation; means for obtaining data based on a data augmentation procedure and the set of data augmentation parameters, the data comprising measured data of the first device and augmented data; and means for training the positioning model based on a combination of the measured data and the augmented data.

In a tenth aspect of the present disclosure, there is provided an apparatus. The apparatus comprises: means for receiving a radio measurement from at least one third device; means for determining a configuration of data augmentation for training a positioning model at the first device based on the measurement from the at least one third device; and means for transmitting, to a first device, the configuration of data augmentation.

In an eleventh aspect of the present disclosure, there is provided an apparatus. The apparatus comprises: means for transmitting, to a second device an assistance request for data augmentation; means for receiving from the second device augmented data for training a positioning model; and means for training the positioning model based on a combination of the augmented data and measured data.

In a twelfth aspect of the present disclosure, there is provided an apparatus. The apparatus comprises: means for receiving from a first device an assistance request for data augmentation; means for obtaining measurement data from a third device; means for determining augmented data for training a positioning model at the first device based on the measurement data; and means for transmitting the augmented data to the first device.

In a thirteen of the present disclosure, there is provided a computer readable medium. The computer readable medium comprises instructions stored thereon for causing an apparatus to perform at least the method according to any of: the fifth aspect, sixth aspect, seventh aspect, or eighth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
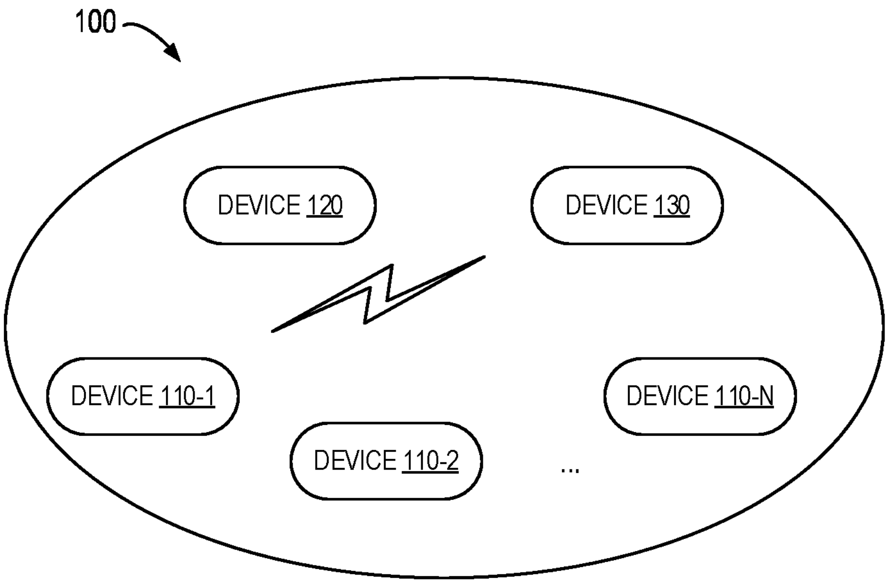
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure.

Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As mentioned above, the AI/ML can be employed in communication systems. For example, positioning accuracy may be enhanced with the use of AI/ML. In addition, the discussions related to data collection for training has been mainly centered around whether data could be collected from the entire simulation area or from a set of grids that are located within the simulation area. The basic assumption seems to be that positioning data is easily available within the system. However, this assumption is only valid for a simulation setting and not applicable for real-world setting, where limited amount of data would be available.

Assuming that a supervised AI/ML model is running at UE side, AI/ML training may require a certain (generally large) amount of labelled data to be able to run AI/ML inference with certain accuracy. A UE alone may need a long time to collect all the necessary data. In this case, the network may support the UE by sending additional labelled data. However, this comes at the cost of additional signaling.

Supervised learning is an important technique for extracting value from big data. However, the effectiveness of supervised learning requires large volumes of high quality training data. In many cases, the size of training data is not large enough for effectively training a supervised learning classifier. Data augmentation is a widely adopted approach for increasing the amount of training data. But the quality of the augmented data may be questionable and dependent on the use case.

With the massive deployment of 5G cellular infrastructures, traffic prediction has become an indispensable part of the cellular resource management system in order to provide reliable and fast communication services that can meet the increasing quality-of-service requirements. A promising approach for handling this problem is to introduce intelligent methods to implement a highly effective and efficient radio resource management procedures using AI/ML models. Meanwhile, integrating the multiaccess edge computing framework in 5G cellular networks facilitates the application of intelligent traffic prediction models by enabling their implementation at the network edge. However, the data shortage and privacy issues may still be obstacles for training a robust and accurate prediction model at the edge. Therefore, it is worthy studying on training the AI/ML models employed in a telecommunication system.

Example Environment

FIG. 1 illustrates an example communication environment 100 in which example embodiments of the present disclosure can be implemented. The communication environment 100 includes a device 110-1, a device 110-2, a device 110-3, . . . , and a device 110-N, which can be collectively referred to as "device(s) 110." The communication environment also includes a device 120 and a device 130. The device(s) 110, the device 120 and the device 130 can communicate with each other.

In the example of FIG. 1, the device 110 may include a terminal device and the device 130 may include a network device serving the terminal device. The device 120 may include a core-network device. For example, the device 120 may include a device on which a location management function (LMF) can be implemented.

It is to be understood that the number of devices and their connections shown in FIG. 1 are only for the purpose of illustration without suggesting any limitation. The communication environment 100 may include any suitable number of devices configured to implementing example embodiments of the present disclosure. Although not shown, it would be appreciated that one or more additional devices may be located in the cell of the device 130, and one or more additional cells may be deployed in the communication environment 100. It is noted that although illustrated as a network device, the device 130 may be other device than a network device. Although illustrated as a terminal device, the device 110 may be other device than a terminal device.

In the following, for the purpose of illustration, some example embodiments are described with the device 110 operating as a terminal device and the device 130 operating as a network device. However, in some example embodiments, operations described in connection with a terminal device may be implemented at a network device or other device, and operations described in connection with a network device may be implemented at a terminal device or other device.

In some example embodiments, if the device 110 is a terminal device and the device 130 is a network device, a link from the device 130 to the device 110 is referred to as a downlink (DL), while a link from the device 110 to the device 130 is referred to as an uplink (UL). In DL, the device 130 is a transmitting (TX) device (or a transmitter) and the device 110 is a receiving (RX) device (or a receiver). In UL, the device 110 is a TX device (or a transmitter) and the device 130 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Work Principle and Example Signaling for Communication

According to some example embodiments of the present disclosure, there is provided a solution for data augmentation for training an AI/ML model. In this solution, a first device receives a configuration for data augmentation from a second device. The first device determines a set of data augmentation parameters based on the configuration. The first device trains a model based on a combination of measured data and augmented data which is obtained based on the set of data augmentation parameters. In this way, it increases amount of quality training data and enables robust model training. Moreover, it can evaluate the integrity of the augmented data set by using the probability values per data point or data segment.

Figure 2:
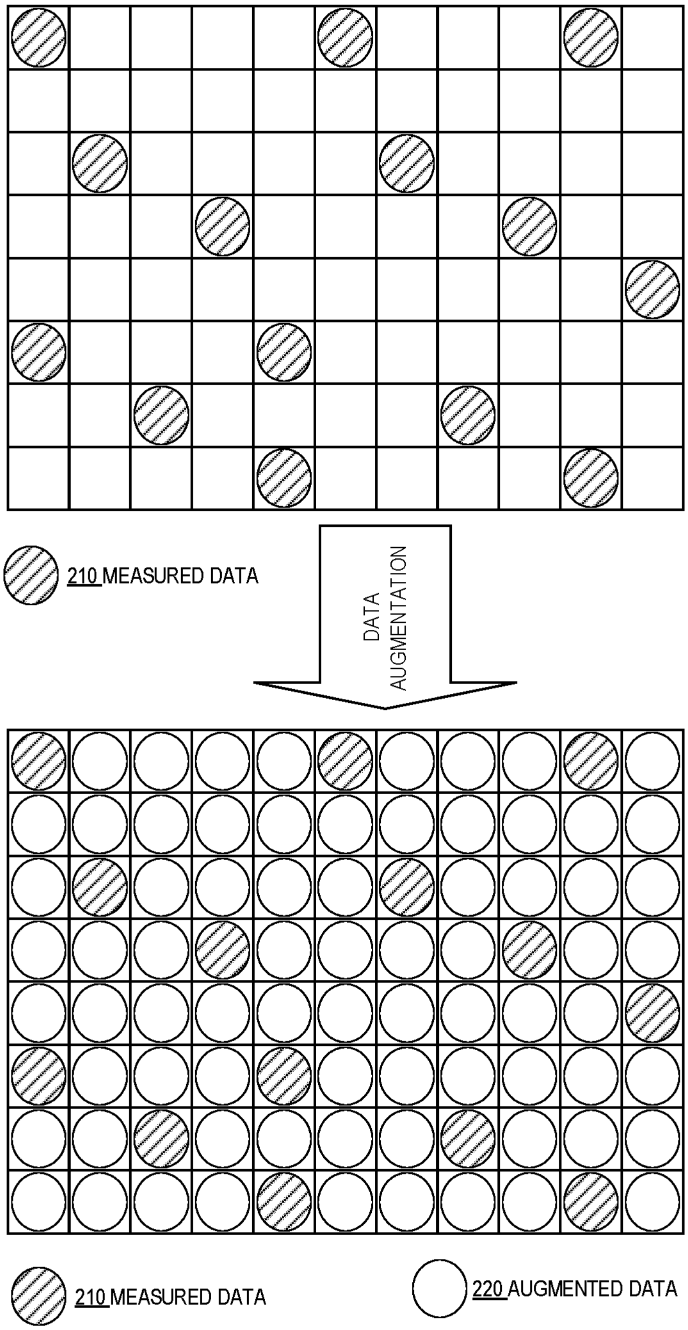
FIG. 2 illustrates a schematic diagram of data collection according to some example embodiments of the present disclosure.

FIG. 2 illustrates a schematic diagram of example data collection according to some example embodiments of the present disclosure. The device 110-1 may be able to gather a set of measurements. For example, the device 110-1 may obtain the measured data 210 as shown in FIG. 2. The size of the collected data may not be sufficient in order to perform the AI/ML model training. In this case, a data augmentation can be applied. The term "data augmentation" used herein can refer to an approach for increasing the amount of data within a region of interest (ROI). Moreover, spatial interpolation techniques may be applied in order to derive additional samples which means radio measurements estimated for the missing locations. In this case, the device 110-1 may obtain the augmented data 220 for the missing locations using the data augmentation. Furthermore, the efficiency of this data augmentation approach is dependent on the tuning of a spatial interpolation function: this relates to a proper selection of the parameters, which can be performed with network assistance. In this way, the amount of data including the measured data 210 and the augmented data 220 is enough for training the model.

Figure 3:
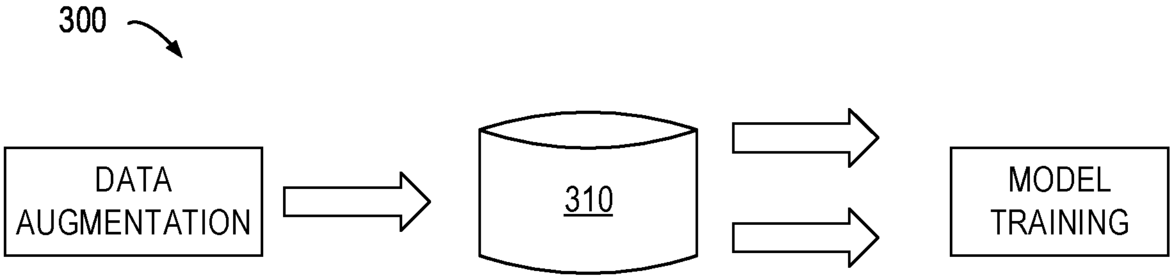
FIG. 3 illustrates a schematic diagram of a structure for model training with data augmentation according to some example embodiments of the present disclosure.

FIG. 3 illustrates a schematic diagram of an example structure 300 for model training with data augmentation according to some example embodiments of the present disclosure. The structure 300 may be implemented at the device 110 shown in FIG. 1. As shown in FIG. 3, in some example embodiments, after the data augmentation is performed using spatial interpolation in order to reach the targeted data size, the labeled dataset module 310 may add an indication to indicate if the data is interpolated or measured so that the AI/ML model training can account additionally for this information. Additionally, the spatial interpolation method can provide the level of data augmentation and associate a probability value per predicted value or per augmented segment of the data. This value can for example indicate the likelihood of the augmented data to be in par or less accurate compared to the measured data. In this way, the AI/ML model can prioritize the measured/real data when minimizing the training error compared to the interpolated or augmented data.

Example embodiments of the present disclosure will be described in detail below with reference to the accompanying drawings.

Figure 4:
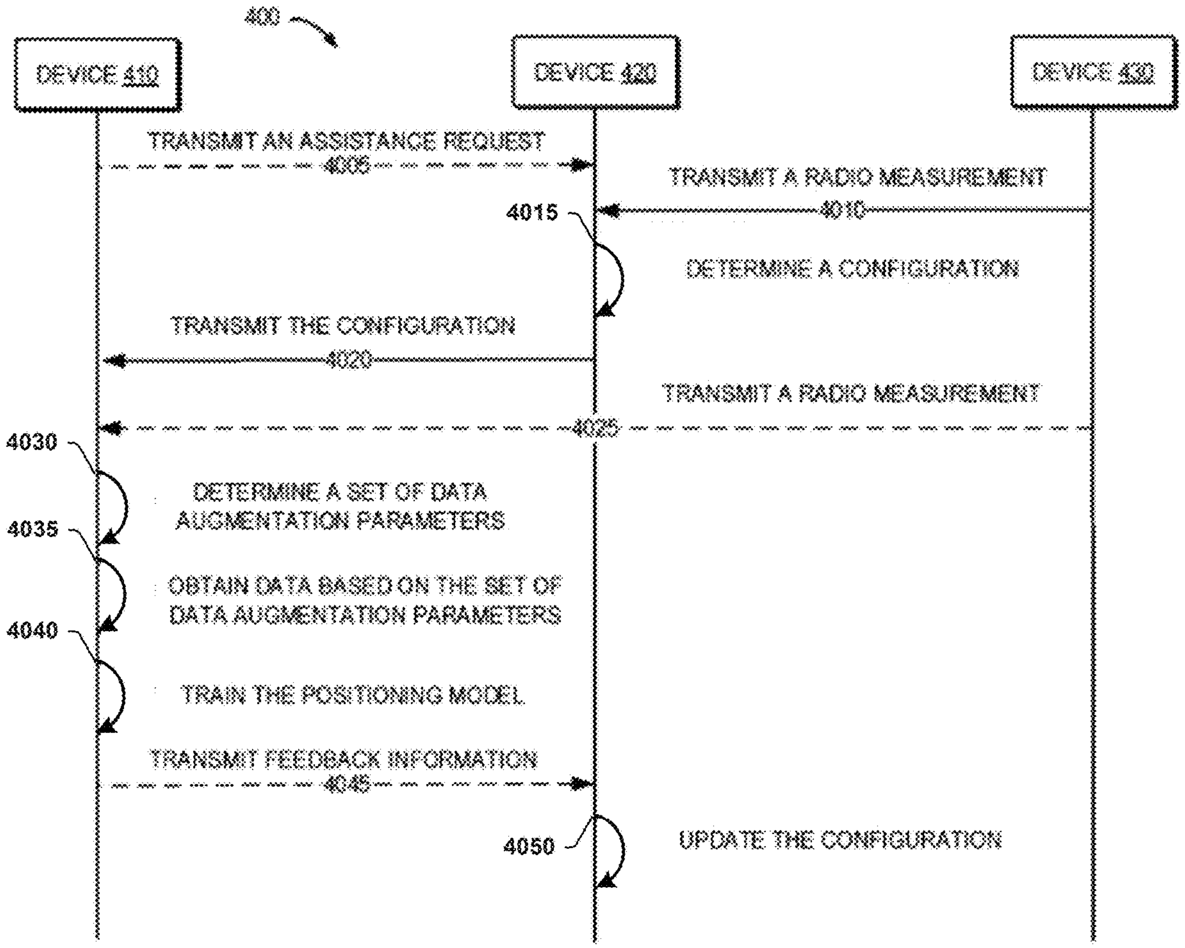
FIG. 4 illustrates a signaling diagram for communication according to some example embodiments of the present disclosure.

Reference is now made to FIG. 4, which shows a signaling diagram for interactions 400 according to some example embodiments of the present disclosure. As shown in FIG. 4, the signaling diagram shows interactions 400 between a device 410, a device 420, and a device 430. For the purpose of discussion, reference is made to FIG. 1 to describe the signaling diagram 200. For example, the device 410 may refer to or comprise the device 110-1 shown in FIG. 1 and the device 430 may refer to or comprise the device 110-2 shown in FIG. 1. The device 420 may refer to or comprise the device 120 shown in FIG. 1. It is noted that the devices 410, 420, and 430 may refer to or comprise any proper devices.

The device 410 may report its capability to the device 420. For example, the capability may comprise one or more supported model of the device 410. Alternatively, or in addition, the capability may comprise memory resources of the device 410. In some other example embodiments, the capability may comprise computational power of the device 410. The capability may comprise computational resources at the device 410. In some example embodiments, the capability may be reported via a long term positioning protocol (LPP) message.

In some example embodiments, the device 410 may proactively initiate a request for data collection (for example, Layer 1 (L1) measurements) in order to train the model at the device 410. For example, the device 410 may transmit 4005 an assistance request for data augmentation to the device 420. In some example embodiments, the assistance request may indicate a proportion of available data with regard to a target data size used in training a positioning model. The term "positioning model" used herein can refer to a processing model or an AIML model which is used for positioning a device. In some example embodiments, the assistance request may be transmitted together with the capability of the device 410. For example, the assistance request and the reported capability may be in a LPP message.

In some example embodiments, the assistance request may include an indication of a current percentage of available data with regard to a target data size for the model training. Only as an example, if the assistance request may indicate 75%, the device 420 may understand that 75% of the target data size has been collected and 25% of the target data size still needs to be collected, which means that 25% of the data needs be interpolated to reach the target data size for training. In this way, the measurement collection and model training can be speed up.

Alternatively, the assistance request may not include the indication of the current percentage of available data. In this case, the device 420 may determine the required percentage of data to be required from the device 410. In some example embodiments, the device 420 may determine the required data based on feedback about the data augmentation performance received at the device 420. Alternatively, the required data may be determined without the feedback.

In some example embodiments, if the device 410 newly joins the network of the device 420, the device 410 may transmit the assistance request to the device 420. Alternatively, if the device 410 determines that current dataset does not enable model training with required accuracy, the device 410 may transmit the assistance request to the device 420. In this case, in some example embodiments, the required accuracy may be based on a positioning accuracy key performance indicator (KPI). Alternatively, or in addition, the required accuracy may be based on one or more intermediate KPIs related to an intermediate model used to line-of-sight (LOS) or non-LOS (NLOS) classification. In some other example embodiments, the required accuracy may be based on a positioning latency of the device 410.

One or more devices may transmit their radio measurements to the device 420. As shown in FIG. 4, the device 430 transmits 4010 a radio measurement of the device 430 to the device 420. The one or more devices may be within a region specified by the device 410. For example, the device 430 may be within a surrounding area of the device 410. In other words, the device 430 may be a neighbor UE of the device 410.

In some example embodiments, the radio measurement may indicate a reference signal received power (RSRP) measured by the device 430. Alternatively, or in addition, the radio measurement may indicate channel state information. In some other example embodiments, the radio measurement may indicate a channel response, for example, a channel impulse response (CIR). Alternatively, or in addition, the radio measurement may indicate one or more of: an angle of arrival (AoA), an angle of departure (AoD), a time difference of arrival (TDoA), or a round trip time (RTT).

The device 420 determines 4015 a configuration of data augmentation for training the positioning model based on the radio measurement. In some example embodiments, the device 420 may determine a set of data augmentation parameters based on the radio measurements. For example, an optimal list of data augmentation parameters may be estimated with the radio measurements or feedbacks from other devices. Only as an example, the set of data augmentation parameters may comprise one or more parameters associated with interpolation function used for predicting data.

Figure 5:
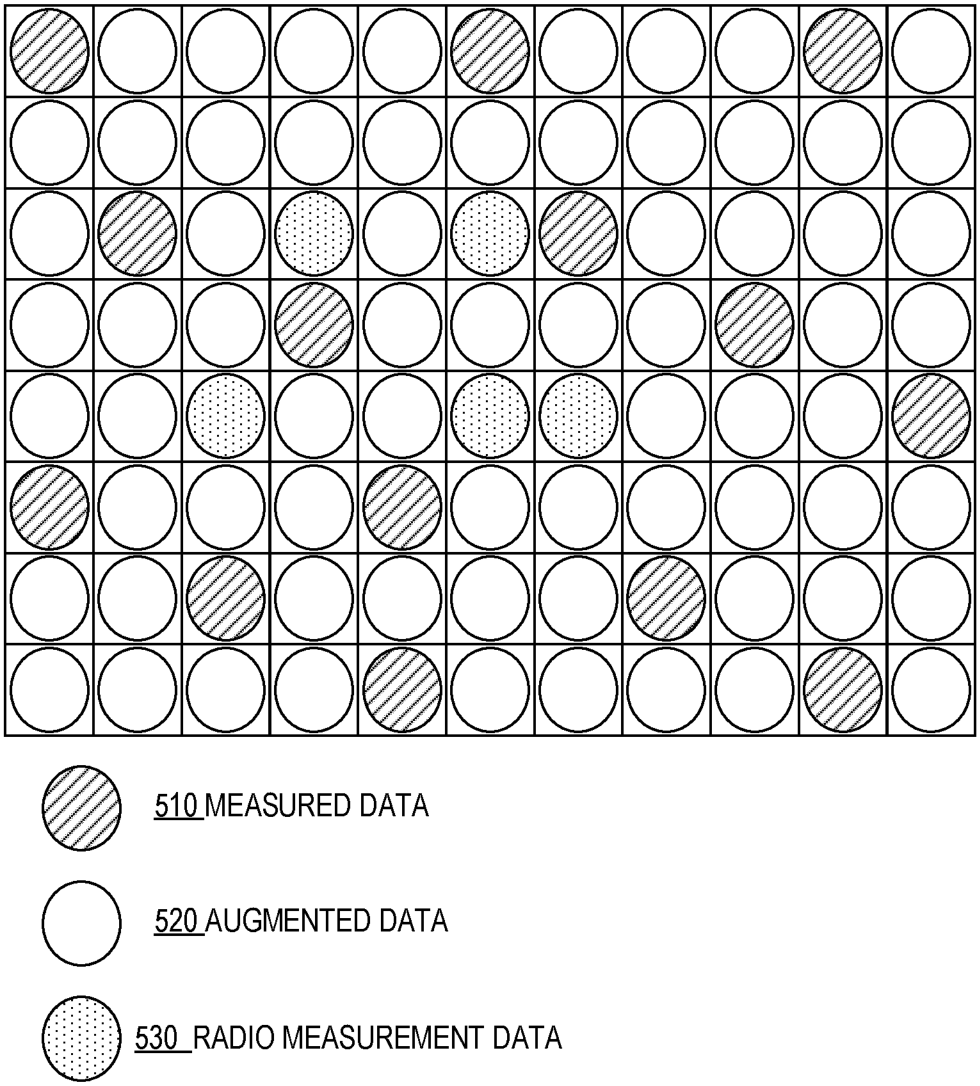
FIG. 5 illustrates a schematic diagram of additional measurements during a measurement request according to some example embodiments of the present disclosure.

The device 420 transmits 4020 the configuration of data augmentation to the device 410. In some example embodiments, the configuration may include the set of data augmentation parameters which are determined by the device 420. Alternatively, the configuration may comprise the radio measurement from the device 430. For example, if the device 420 determines that the device 430 is located in the surrounding area of the device 410 based on a coarse location of the device 410, the configuration of data augmentation may comprise the radio measurement from the device 430. Only as an example, as shown in FIG. 5, the neighbor measurement data 530 from the device 430 may be provided to the device 410. In some other example embodiments, the configuration of data augmentation may comprise an indication regarding whether the data for training the positioning model is interpolated or measured. The configuration of data augmentation may also indicate a dimension (for example, temporal or spatial) of the data for training the positioning model.

In some example embodiments, the device 430 may directly transmit 4025 the radio measurement to the device 410. For example, the radio measurement may be transmitted via a sidelink between the devices 410 and 430.

In some example embodiments, the device 420 may proactively transmit the configuration of data augmentation. In other words, the transmission of the configuration of data augmentation may not be based on the assistance request.

Figure 6A:
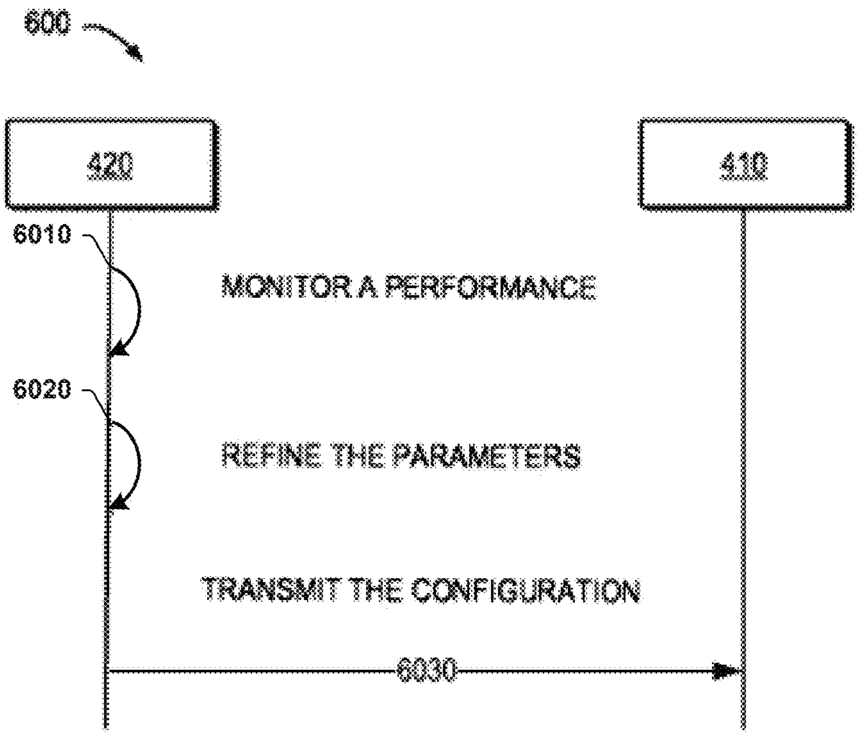
FIG. 6A and FIG. 6B illustrate signaling diagrams for communication according to some example embodiments of the present disclosure.

In some example embodiments, the configuration of data augmentation may be transmitted aperiodically. FIG. 6A shows a signaling diagram for interactions 600 according to some example embodiments of the present disclosure. As shown in FIG. 6A, the signaling diagram shows interactions 600 between the device 410 and the device 420. The device 420 may monitor 6010 a performance at the device 410. If a performance degradation of the device 410 is detected or observed by the device 420, the device 420 may refine 6020 or update the set of data augmentation parameters. For example, if the device 420 observes a systematic high location uncertainty of the device 410, the device 420 may refine the set of data augmentation parameters. The device 420 may transmit 6030 the configuration of data augmentation to the device 410. In this case, the configuration of data augmentation may further indicate a validity period of the configuration of data augmentation. For example, the new parameterization may be accompanied by a validity period, i.e. a maximum duration for which the configuration is deemed to be valid by the device 420. This may be expressed as a number of subframes for which the configuration is valid, starting with the time when the message was received at the device 410 side.

Figure 6B:
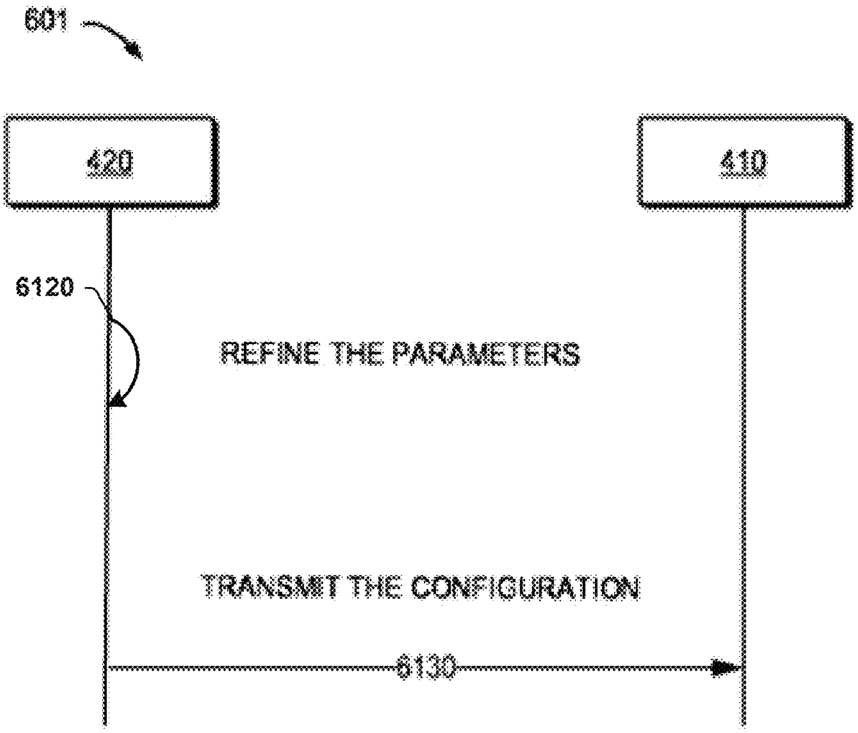

In some example embodiments, the configuration of data augmentation may be transmitted periodically. FIG. 6B shows a signaling diagram for interactions 601 according to some example embodiments of the present disclosure. As shown in FIG. 6B, the signaling diagram shows interactions 601 between the device 410 and the device 420. The device 420 may refine 6120 or update the set of data augmentation parameters. The device 420 may transmit 6130 the configuration of data augmentation to the device 410. In this case, the configuration of data augmentation may further indicate a validity period of the configuration of data augmentation. For example, the new parameterization may be accompanied by a validity period, i.e. a maximum duration for which the configuration is deemed to be valid by the device 420. This may be expressed as a number of subframes for which the configuration is valid, starting with the time when the message was received at the device 410 side.

Referring back to FIG. 4, the device 410 determines 4030 a set of data augmentation parameters based on the configuration of data augmentation. For example, in some example embodiments, if the configuration of data augmentation includes the set of data augmentation parameters, the device 410 may extract the set of data augmentation parameters from the configuration of data augmentation.

Alternatively, if the configuration of data augmentation includes the radio measurement from the device 430, the device 410 may determine the set of data augmentation parameters based on the radio measurement of the device 430. For example, the device 410 may adjust the set of data augmentation parameters based on the radio measurement. In some example embodiments, the set of data augmentation parameters (for example, spatial interpolation parameters) may be tuned by minimizing an error between interpolated data and data reported from the device 430.

In some example embodiments, as mentioned above, the radio measurement may be transmitted via the sidelink between the devices 410 and 430. In this case, the device 410 may determine the set of data augmentation parameters based on the radio measurement from the device 430.

The device 410 obtains 4035 data for training the positioning model based on a data augmentation procedure and the set of data augmentation parameters. In other words, the device 410 may perform the data augmentation utilizing the configuration of data augmentation from the device 420. For example, the device 410 may select a kriging procedure as the data augmentation procedure. It is noted that the data augmentation procedure may be any proper procedure that can increase amount of data for training. The data for training the positioning model include measured data of the device 410 and augmented data generated based on the set of data augmentation parameters. Alternatively, the data for training the positioning model may also include the radio measurement data from the device 430. For example, as shown in FIG. 5, the data for training the positioning mode may include the measured data 510, the augmented data 520 and the radio measurement data 530. The augmented data 520 can be estimated for the locations which are not measured by the device 410. In this way, the amount of quality training data has been increased.

The device 410 trains 4040 the positioning model based on a combination of the measured data and the augmented data. For example, the combination of the measured data and the augmented data may indicate data at a certain position is measured and data at another certain position is interpolated (i.e., augmented). In some example embodiments, the combination of the measured data and the augmented data may be based on their weights. For example, the measured data may have a higher weight than the augmented data. In this way, it enables robust model training. Moreover, it enables a method to evaluate the integrity of the augmented data set by using the probability values per data point or data segment. For example, in case large data segments are only predicted, then the location estimate may not be used for critical applications based on the associated probability value.

Only as an example for spatial interpolation, kriging technique which is a spatial interpolation technique can be used. Kriging assumes that the missing values can be estimated with weighted linear combinations of the available neighboring values. Computation of the Kriging weights may be based on the relation between the observed values, expressed through the spatial autocovariance function.

In some example embodiments, the device 410 may transmit 4045 feedback information indicating a current data augmentation performance to the device 420. For example, the feedback information may indicate an achieved interpolation accuracy at the device 410. In this case, the device 420 may update 4050 the configuration of data augmentation based on the feedback information. For example, the device 420 may increase the region to collect neighbor device radio measurements. Only as an example, if the achieved interpolation accuracy indicated in the feedback information is below a threshold value, the device 420 may increase the region to collect the radio measurements.

According to example embodiments of the present disclosure, it proposes a method and a procedure which targets data augmentation for AI/ML-based positioning with AI/ML inference running at the UE side. For example, it proposes a method which allows to increase the amount of raw labelled data: radio measurements and corresponding geographical position. The additional signaling may ensure efficient data augmentation operation at UE with network assistance. Regarding data augmentation method, the case of the supervised learning method running at UE side may be considered either: to estimate useful features to estimate its localization such as LOS/NLOS classification or to estimate directly its localization.

Figure 7:
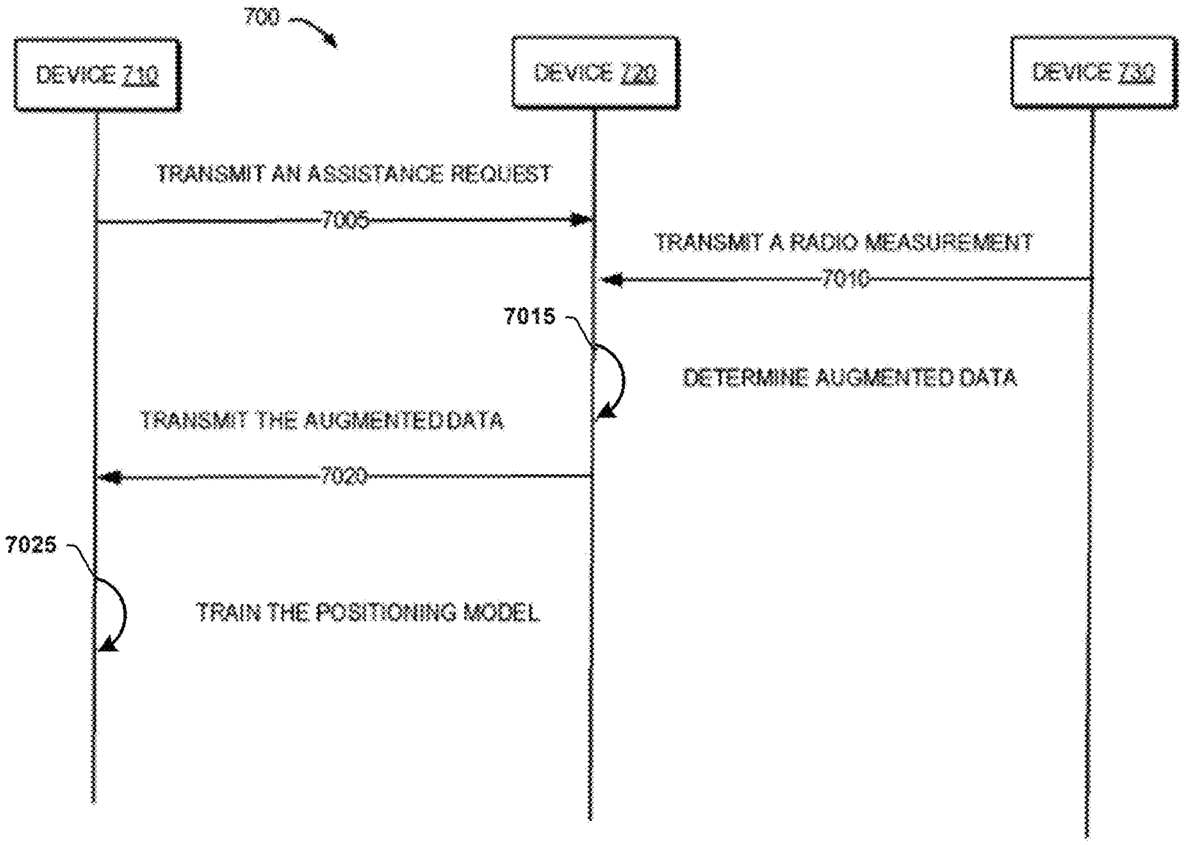
FIG. 7 illustrates a signaling diagram for communication according to some example embodiments of the present disclosure.

Reference is now made to FIG. 7, which shows a signaling diagram for interactions 700 according to some example embodiments of the present disclosure. As shown in FIG. 7, the signaling diagram shows interactions 700 between a device 710, a device 720, and a device 730. For the purpose of discussion, reference is made to FIG. 1 to describe the signaling diagram 700. For example, the device 710 may refer to or comprise the device 110-1 shown in FIG. 1 and the device 730 may refer to or comprise the device 110-2 or the device 130 shown in FIG. 1. The device 720 may refer to or comprise the device 120 shown in FIG. 1. It is noted that the devices 710, 720, and 730 may refer to or comprise any proper devices.

The device 710 may report its capability to the device 720. For example, the capability may comprise one or more supported model of the device 710. Alternatively, or in addition, the capability may comprise memory resources of the device 710. In some other example embodiments, the capability may comprise computational power of the device 710. The capability may comprise computational resources at the device 710. In some example embodiments, the capability may be reported via a long term positioning protocol (LPP) message.

In some example embodiments, the device 710 may proactively initiate a request for data collection (for example, Layer 1 (L1) measurements) in order to train the model at the device 710. For example, the device 710 may transmit 7005 an assistance request for data augmentation to the device 720. In some example embodiments, the assistance request may indicate a proportion of available data with regard to a target data size used in training a positioning model. The term "positioning model" used herein can refer to a processing model or an AIML model which is used for positioning a device. In some example embodiments, the assistance request may be transmitted together with the capability of the device 710. For example, the assistance request and the reported capability may be in a LPP message.

In some example embodiments, the assistance request may include an indication of a current percentage of available data with regard to a target data size for the model training. Only as an example, if the assistance request may indicate 75%, the device 720 may understand that 75% of the target data size has been collected and 25% of the target data size still needs to be collected. In this way, the measurement collection and model training can be speed up.

Alternatively, the assistance request may not include the indication of the current percentage of available data. In this case, the device 720 may determine the required percentage of data to be required from the device 410 based on feedback about the data augmentation performance received at the device 720.

In some example embodiments, if the device 710 newly joins the network of the device 720, the device 710 may transmit the assistance request to the device 720. Alternatively, if the device 710 determines that current dataset does not enable model training with required accuracy, the device 710 may transmit the assistance request to the device 720. In this case, in some example embodiments, the required accuracy may be based on a positioning accuracy key performance indicator (KPI). Alternatively, or in addition, the required accuracy may be based on one or more intermediate KPIs related to an intermediate model used to line-of-sight (LOS) or non-LOS (NLOS) classification. In some other example embodiments, the required accuracy may be based on a positioning latency of the device 410.

One or more devices may transmit their radio measurements to the device 720. As shown in FIG. 7, the device 730 transmits 7010 a radio measurement of the device 730 to the device 720. In some example embodiments, the device 430 may be within a surrounding area of the device 410. In other words, the device 430 may be a neighbor UE of the device 410. In some example embodiments, the radio measurement may indicate a reference signal received power (RSRP) measured by the device 730. Alternatively, or in addition, the radio measurement may indicate channel state information. In some other example embodiments, the radio measurement may indicate a channel response, for example, a channel impulse response (CIR). Alternatively, or in addition, the radio measurement may indicate one or more of: an angle of arrival (AoA), an angle of departure (AoD), a time difference of arrival (TDoA), or a round trip time (RTT).

Alternatively, the device 730 may be the network device associated the device 710. In this case, the data collection is done by the network device (i.e., the device 730) participating in the positioning process of the device 710, namely the serving gNB and the neighboring gNBs. The gNBs may specifically collect measurements of UL sounding reference signal (SRS) (or UL SRS for positioning-SRS-P) signals emanated by the device 710 while the device 710 being in specified locations). The gNBs then may provide such measurements to the device 720, while the other device (for example, the device 110-2) may provide the location that the SRS were transmitted to the device 730. In this way, it can apply to DL positioning, UL positioning, as well as UL plus DL positioning.

The device 720 determines 7015 data for training the positioning model based on the radio measurement. In other words, the device 720 may perform the data augmentation. For example, the device 720 may select a kriging procedure as the data augmentation procedure. It is noted that the data augment procedure may be any proper procedure that can increase amount of data for training. The data for training the positioning model include measured data of the device 730 and augmented data. Alternatively, the data for training the positioning model may also include the radio measurement data from the device 730.

The device 720 transmits 7020 the data to the device 710 for training the positioning model. For example, the data may be transmitted in a LPP message.

The device 710 trains 7025 the positioning model based on a combination of the measured data and the augmented data. For example, the combination of the measured data and the augmented data may indicate data at a certain position is measured and data at another certain position is interpolated (i.e., augmented). In some example embodiments, the combination of the measured data and the augmented data may be based on their weights. For example, the measured data may have a higher weight than the augmented data. In this way, it enables robust model training. Moreover, it enables a method to evaluate the integrity of the augmented data set by using the probability values per data point or data segment. For example, in case large data segments are only predicted, then the location estimate may not be used for critical applications based on the associated probability value.

Example Methods

Figure 8:
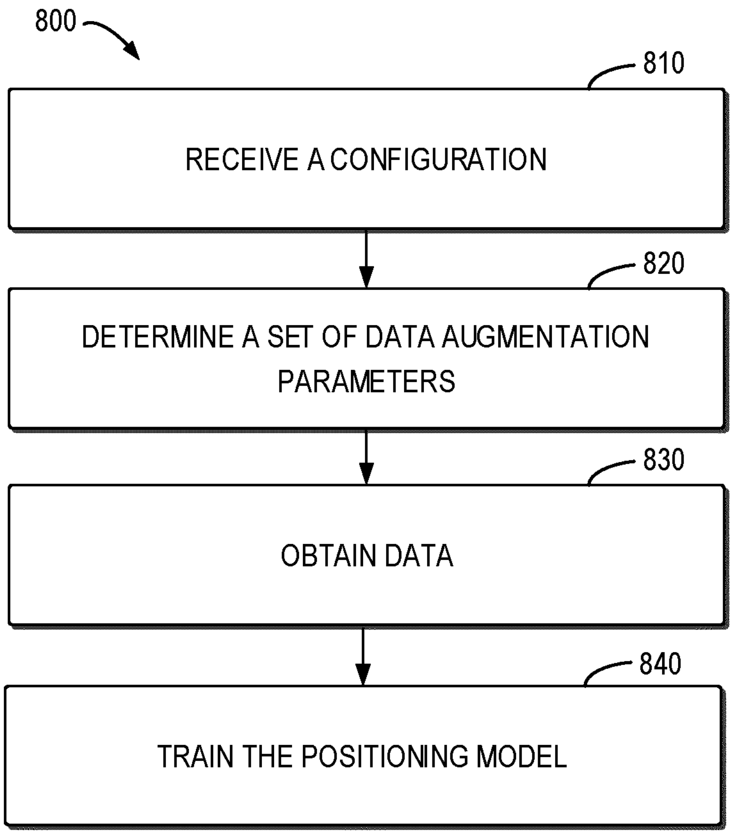
FIG. 8 illustrates a flowchart of a method according to some example embodiments of the present disclosure.

FIG. 8 shows a flowchart of an example method 800 implemented at or performed by a first device in accordance with some example embodiments of the present disclosure. For the purpose of discussion, the method 800 will be described from the perspective of the device 110 in FIG. 1.

At block 810, the first device receives, from a second device, a configuration of data augmentation for training a positioning model at the first device. In some example embodiments, the first device may transmit to the second device an assistance request for the data augmentation. For example, the assistance request may further indicate a proportion of available data with regard to a target data size used in training the positioning model. In some example embodiments, the configuration of data augmentation may comprise an indication regarding whether data for training the positioning model is interpolated or measured.

At block 820, the first device determines a set of data augmentation parameters based on the configuration of data augmentation. In some example embodiments, the configuration of data augmentation may comprise the set of data augmentation parameters which is based on a radio measurement of a third device. In this case, the first device may extract the set of data augmentation parameters from the configuration of data augmentation.

Alternatively, the configuration of data augmentation may comprise a radio measurement of a third device. In this case, the first device may determine the set of data augmentation parameters based on the radio measurement of the third device.

In other example embodiments, the first device may receive a radio measurement of the third device via a sidelink between the first device and the third device. In this case, the first device may determine the set of data augmentation parameters based on the radio measurement of the third device.

At block 830, the first device obtains data based on a data augmentation procedure and the set of data augmentation parameters. The data comprises measured data of the first device and augmented data.

At block 840, the first device trains the positioning model based on a combination of the measured data and the augmented data. For example, the combination of the measured data and the augmented data may indicate data at a certain position is measured and data at another certain position is interpolated (i.e., augmented). In some example embodiments, the combination of the measured data and the augmented data may be based on their weights. For example, the measured data may have a higher weight than the augmented data. In this way, it enables robust model training. In some example embodiments, the first device may transmit to the second device feedback information indicating a current data augmentation performance at the first device.

Figure 9:
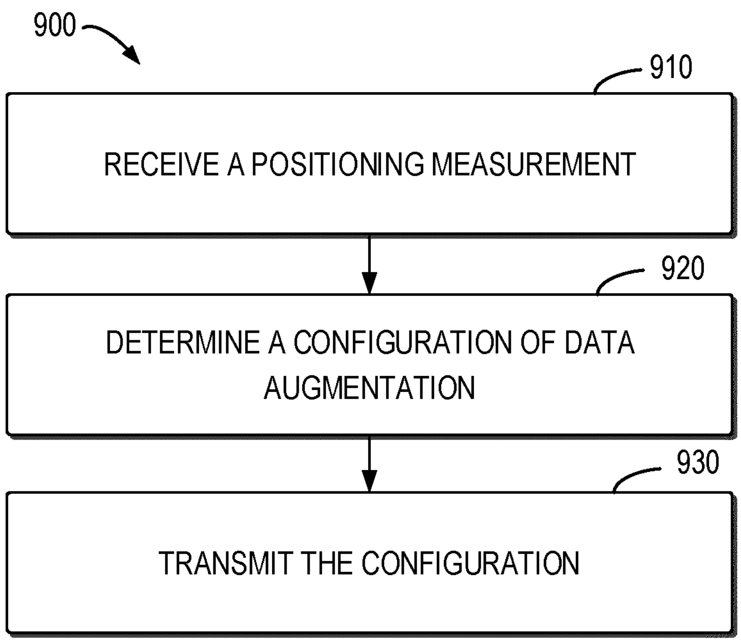
FIG. 9 illustrates a flowchart of a method according to some example embodiments of the present disclosure.

FIG. 9 shows a flowchart of an example method 900 implemented at or performed by a second device in accordance with some example embodiments of the present disclosure. For the purpose of discussion, the method 900 will be described from the perspective of the device 120 in FIG. 1.

At block 910, the second device receives a radio measurement from a third device.

At block 920, the second device determines a configuration of data augmentation for training a positioning model at the first device based on the measurement from the third device. In some example embodiments, the configuration of data augmentation may further indicate a validity period of the configuration of data augmentation.

At block 930, the second device transmits, to a first device, the configuration of data augmentation. In some example embodiments, the second device may determine a set of data augmentation parameters based on the radio measurement. In this case, the configuration of data augmentation may comprise the set of data augmentation parameters. Alternatively, the configuration of data augmentation may comprise the radio measurement of the third device.

In some example embodiments, the second device may receive from the first device an assistance request for the data augmentation. For example, the assistance request may further indicate a proportion of available data with regard to a target data size used in training the positioning model.

In some example embodiments, the second device may monitor a performance of the first device. In this case, if a performance degradation of the first device is detected, the second device may transmit the configuration of data augmentation to the first device. Alternatively, the second device may transmit the configuration of data augmentation periodically.

In some example embodiments, the second device may receive from the first device feedback information indicating a current data augmentation performance at the first device. In this case, the second device may update the configuration of data augmentation based on the feedback information.

Figure 10:
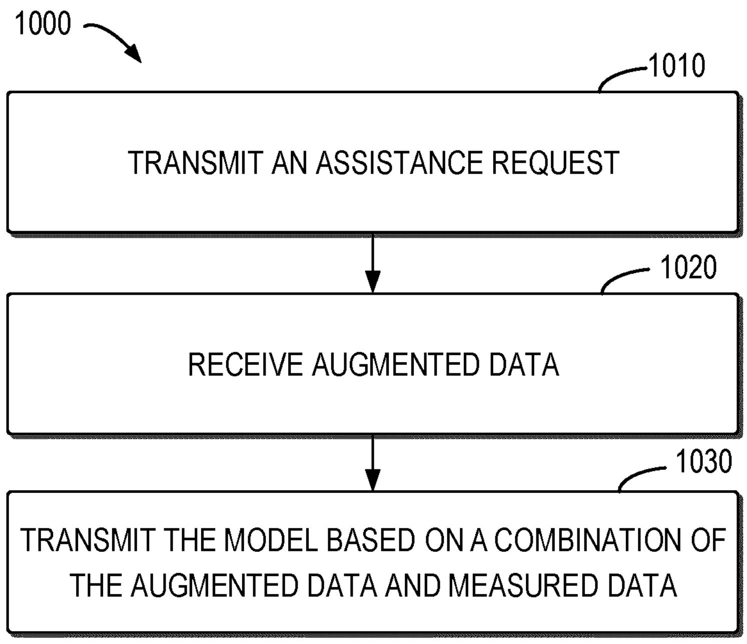
FIG. 10 illustrates a flowchart of a method according to some example embodiments of the present disclosure.

FIG. 10 shows a flowchart of an example method 1000 implemented at or performed by a first device in accordance with some example embodiments of the present disclosure. For the purpose of discussion, the method 1000 will be described from the perspective of the device 110 in FIG. 1.

At block 1010, the first device transmits to a second device an assistance request for data augmentation. In some example embodiments, the assistance request may further indicate a proportion of available data with regard to a target data size used in training the positioning model.

At block 1020. the first device receives from the second device augmented data for training a positioning model.

At block 1030, the first device trains the positioning model based on a combination of the augmented data and measured data. For example, the combination of the measured data and the augmented data may indicate data at a certain position is measured and data at another certain position is interpolated (i.e., augmented). In some example embodiments, the combination of the measured data and the augmented data may be based on their weights. For example, the measured data may have a higher weight than the augmented data. In this way, it enables robust model training.

Figure 11:
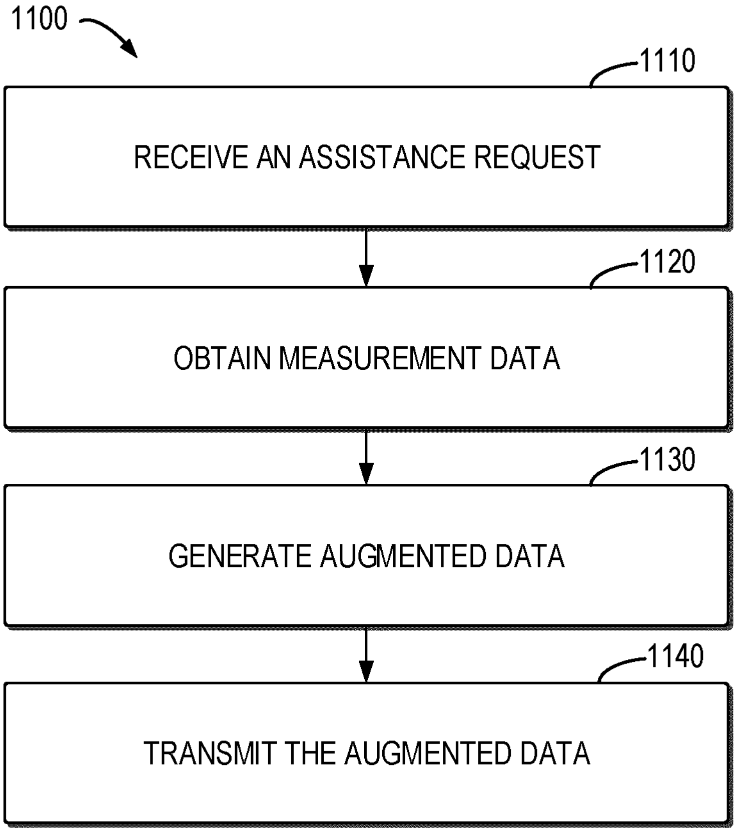
FIG. 11 illustrates a flowchart of a method according to some example embodiments of the present disclosure.

FIG. 11 shows a flowchart of an example method 1100 implemented at or performed by a second device in accordance with some example embodiments of the present disclosure. For the purpose of discussion, the method 1100 will be described from the perspective of the device 120 in FIG. 1.

At block 1110, the second device receives from a first device an assistance request for data augmentation. In some example embodiments, the assistance request may further indicate a proportion of available data with regard to a target data size used in training the positioning model.

At block 1120, the second device obtains measurement data from a third device. In some example embodiments, the measurement data may comprise at least one of: uplink measurement data or downlink measurement data.

At block 1130, the second device generates augmented data for training a positioning model at the first device based on the measurement data.

At block 1140, the second device transmits the augmented data to the first device.

Example Apparatus, Device and Medium

In some example embodiments, a first apparatus capable of performing any of the method 800 (for example, the device 110 in FIG. 1) may comprise means for performing the respective operations of the method 800. The means may be implemented in any suitable form. For example, the means may be implemented in a circuitry or software module.

In some example embodiments, the first apparatus comprises means for receiving, from a second device, a configuration of data augmentation for training a positioning model at the first device; means for determining a set of data augmentation parameters based on the configuration of data augmentation; means for obtaining data based on a data augmentation procedure and the set of data augmentation parameters, the data comprising measured data of the first device and augmented data; and means for training the positioning model based on a combination of the measured data and the augmented data.

In some example embodiments, the first apparatus comprises means for transmitting to the second device an assistance request for the data augmentation.

In some example embodiments, the assistance request further indicates a proportion of available data with regard to a target data size used in training the positioning model.

In some example embodiments, the configuration of data augmentation comprises the set of data augmentation parameters which is based on a radio measurement of a third device. In some example embodiments, the means for determining the set of data augmentation parameters comprises: means extracting the set of data augmentation parameters from the configuration of data augmentation.

In some example embodiments, the configuration of data augmentation comprises a radio measurement of a third device.

In some example embodiments, the means for determining the set of data augmentation parameters comprises: means for determining the set of data augmentation parameters based on the radio measurement of the third device.

In some example embodiments, the first apparatus comprises means for receiving, from a third device, a radio measurement of the third device via a sidelink between the first device and the third device; and means for determining the set of data augmentation parameters based on the radio measurement of the third device.

In some example embodiments, the configuration of data augmentation comprises: an indication regarding whether data for training the positioning model is interpolated or measured.

In some example embodiments, the first apparatus comprises means for transmitting to the second device feedback information indicating a current data augmentation performance at the first device.

In some example embodiments, the first device comprises a terminal device, and the second device comprises a network device.

In some example embodiments, a second apparatus capable of performing any of the method 900 (for example, the device 120 in FIG. 1) may comprise means for performing the respective operations of the method 900. The means may be implemented in any suitable form. For example, the means may be implemented in a circuitry or software module.

In some example embodiments, the second apparatus comprises means for receiving a radio measurement from a third device; means for determining a configuration of data augmentation for training a positioning model at the first device based on the measurement from the third device; and means for transmitting, to a first device, the configuration of data augmentation.

In some example embodiments, the second apparatus comprises means for determining a set of data augmentation parameters based on the radio measurement; and means for transmitting to the first device the configuration of data augmentation comprising the set of data augmentation parameters.

In some example embodiments, the configuration of data augmentation comprises the radio measurement of the third device.

In some example embodiments, the second apparatus comprises means for receiving from the first device an assistance request for the data augmentation.

In some example embodiments, the assistance request further indicates a proportion of available data with regard to a target data size used in training the positioning model.

In some example embodiments, the means for transmitting the configuration of data augmentation comprises: means for monitoring a performance of the first device; means for in accordance with a determination that a performance degradation of the first device is detected, transmitting the configuration of data augmentation to the first device.

In some example embodiments, the means for transmitting the configuration of data augmentation comprises: means for transmitting the configuration of data augmentation periodically.

In some example embodiments, he configuration of data augmentation further indicates a validity period of the configuration of data augmentation.

In some example embodiments, the second apparatus comprises means for receiving from the first device feedback information indicating a current data augmentation performance at the first device; and means for updating the configuration of data augmentation based on the feedback information.

In some example embodiments, the first device comprises a terminal device, the second device comprises a network device, and the third device comprises another terminal device.

In some example embodiments, a first apparatus capable of performing any of the method 1000 (for example, the device 110 in FIG. 1) may comprise means for performing the respective operations of the method 1000. The means may be implemented in any suitable form. For example, the means may be implemented in a circuitry or software module.

In some example embodiments, the first apparatus comprises means for transmitting, to a second device an assistance request for data augmentation; means for receiving from the second device augmented data for training a positioning model; and means for training the positioning model based on a combination of the augmented data and measured data.

In some example embodiments, the assistance request further indicates a proportion of available data with regard to a target data size used in training the positioning model.

In some example embodiments, the first device comprises a terminal device, and the second device comprises a network device.

In some example embodiments, a second apparatus capable of performing any of the method 1100 (for example, the device 120 in FIG. 1) may comprise means for performing the respective operations of the method 1100. The means may be implemented in any suitable form. For example, the means may be implemented in a circuitry or software module.

In some example embodiments, the second apparatus comprises means for receiving from a first device an assistance request for data augmentation; means for obtaining measurement data from a third device; means for generating augmented data for training a positioning model at the first device based on the measurement data; and means for transmitting the augmented data to the first device.

In some example embodiments, the assistance request further indicates a proportion of available data with regard to a target data size used in training the positioning model.

In some example embodiments, the measurement data comprises at least one of: uplink measurement data or downlink measurement data.

In some example embodiments, the first device comprises a terminal device, the second device comprises a network device, and the third device comprises another terminal device or another network device.

Figure 12:
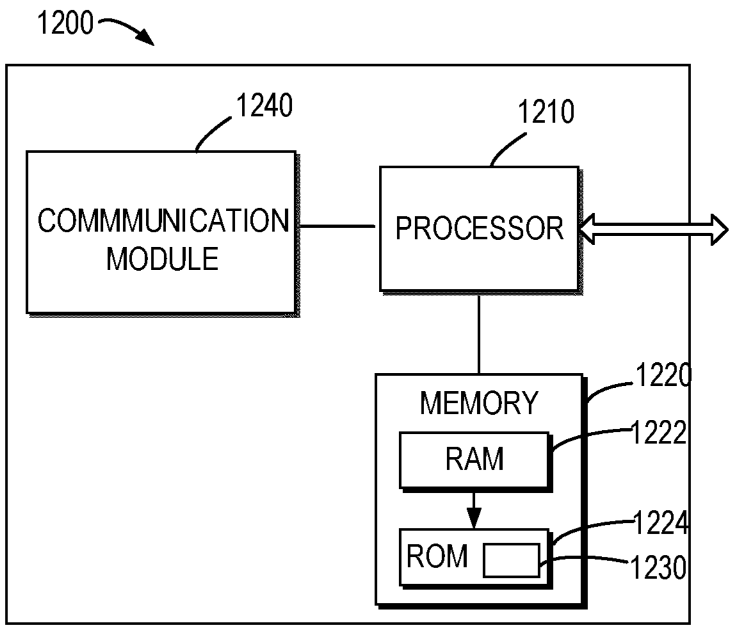
FIG. 12 illustrates a simplified block diagram of a device that is suitable for implementing example embodiments of the present disclosure.

FIG. 12 is a simplified block diagram of a device 1200 that is suitable for implementing example embodiments of the present disclosure. The device 1200 may be provided to implement a communication device, for example, the device 110 or the device 120 as shown in FIG. 1. As shown, the device 1200 includes one or more processors 1210, one or more memories 1220 coupled to the processor 1210, and one or more communication modules 1240 coupled to the processor 1210.

The communication module 1240 is for bidirectional communications. The communication module 1240 has one or more communication interfaces to facilitate communication with one or more other modules or devices. The communication interfaces may represent any interface that is necessary for communication with other network elements. In some example embodiments, the communication module 1240 may include at least one antenna.

The processor 1210 may be of any type suitable to the local technical network and may include one or more of the following: general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may include one or more non-volatile memories and one or more volatile memories. Examples of the non-volatile memories include, but are not limited to, a Read Only Memory (ROM) 1224, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1222 and other volatile memories that will not last in the power-down duration.

A computer program 1230 includes computer executable instructions that are executed by the associated processor 1210. The instructions of the program 1230 may include instructions for performing operations/acts of some example embodiments of the present disclosure. The program 1230 may be stored in the memory, e.g., the ROM 1224. The processor 1210 may perform any suitable actions and processing by loading the program 1230 into the RAM 1222.

The example embodiments of the present disclosure may be implemented by means of the program 1230 so that the device 1200 may perform any process of the disclosure as discussed with reference to FIG. 4 to FIG. 11. The example embodiments of the present disclosure may also be implemented by hardware or by a combination of software and hardware.

In some example embodiments, the program 1230 may be tangibly contained in a computer readable medium which may be included in the device 1200 (such as in the memory 1220) or other storage devices that are accessible by the device 1200. The device 1200 may load the program 1230 from the computer readable medium to the RAM 1222 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 13:
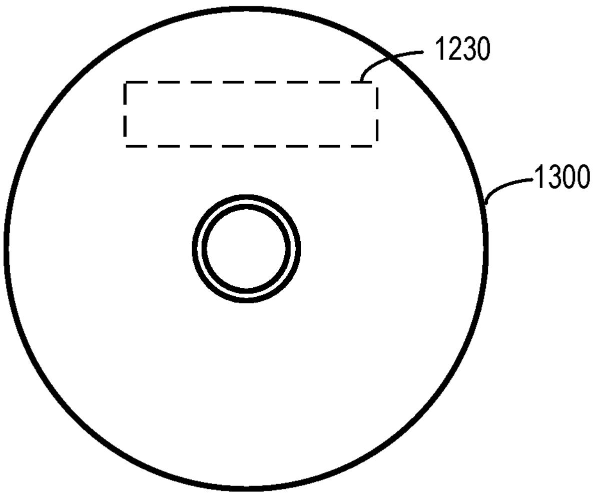
FIG. 13 illustrates a block diagram of an example computer readable medium in accordance with some example embodiments of the present disclosure.

FIG. 13 shows an example of the computer readable medium 1300 which may be in form of CD, DVD or other optical storage disk. The computer readable medium 1300 has the program 1230 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provides at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory storing instructions that, when executed by the at least one processor, cause the first device at least to perform:

receiving, from a second device, a configuration of data augmentation for training a positioning model at the first device;

determining a set of data augmentation parameters based on the configuration of data augmentation;

obtaining data based on a data augmentation procedure and the set of data augmentation parameters, the data comprising measured data of the first device and augmented data, wherein the data augmentation procedure comprises a spatial interpolation technique, and wherein the augmented data comprises radio measurements estimated for locations not measured by the first device within a region of interest; and training the positioning model based on a combination of the measured data and the augmented data, wherein the combination is based on respective weights assigned to the measured data and the augmented data, the measured data having a higher weight than the augmented data, and wherein a probability value is associated per augmented data point or per augmented segment of the data, the probability value indicating a likelihood of accuracy of the augmented data compared to the measured data; and transmitting to the second device an assistance request for the data augmentation, wherein the first device comprises a terminal device, and the second device comprises a network device.

2. The first device of claim 1, wherein the assistance request further indicates a proportion of available data with regard to a target data size used in training the positioning model.

3. The first device of claim 1, wherein the configuration of data augmentation comprises the set of data augmentation parameters which is based on a radio measurement of a third device; and wherein determining the set of data augmentation parameters comprises:

extracting the set of data augmentation parameters from the configuration of data augmentation.

4. The first device of claim 1, wherein the configuration of data augmentation comprises a radio measurement of a third device.

5. The first device of claim 4, wherein determining the set of data augmentation parameters comprises:

determining the set of data augmentation parameters based on the radio measurement of the third device.

6. The first device of claim 1, wherein the first device is further caused to perform:

receiving, from a third device, a radio measurement of the third device via a sidelink between the first device and the third device; and determining the set of data augmentation parameters based on the radio measurement of the third device.

7. The first device of claim 1, wherein the configuration of data augmentation comprises:

an indication regarding whether data for training the positioning model is interpolated or measured.

8. The first device of claim 1, wherein the first device is further caused to perform:

transmitting to the second device feedback information indicating a current data augmentation performance at the first device.

9. A second device comprising:

at least one processor; and at least one memory storing instructions that, when executed by the at least one processor, cause the second device at least to perform:

receiving a radio measurement from a third device, the third device being within a surrounding area of the first device;

determining a configuration of data augmentation for training a positioning model at a first device based on the measurement from the third device, the configuration of data augmentation comprising one or more parameters associated with a spatial interpolation function for estimating data at locations not measured by the first device;

transmitting, to a first device, the configuration of data augmentation; and receiving from the first device an assistance request for the data augmentation, the assistance request indicating a proportion of available data with regard to a target data size used in training the positioning model, wherein training the positioning model is based on a combination of measured data and augmented data, wherein the combination is based on respective weights assigned to the measured data and the augmented data, the measured data having a higher weight than the augmented data, and wherein a probability value is associated per augmented data point or per augmented segment of the data, the probability value indicating a likelihood of accuracy of the augmented data compared to the measured data, and wherein the first device comprises a terminal device, the second device comprises a network device, and the third device comprises another terminal device.

10. The second device of claim 9, wherein transmitting the configuration of data augmentation comprises:

monitoring a performance of the first device; and in accordance with a determination that a performance degradation of the first device is detected, transmitting the configuration of data augmentation to the first device.

11. The second device of claim 10, wherein the configuration of data augmentation further indicates a validity period of the configuration of data augmentation.

12. The second device of claim 9, wherein the second device is further caused to perform:

receiving from the first device feedback information indicating a current data augmentation performance at the first device; and updating the configuration of data augmentation based on the feedback information.

13. A method comprising:

transmitting, by a first device to a second device, an assistance request for data augmentation for training a positioning model at the first device, the assistance request including an indication of a current percentage of available data with regard to a target data size for training the positioning model;

receiving, from the second device, a configuration of data augmentation;

determining a set of data augmentation parameters based on the configuration of data augmentation, wherein the set of data augmentation parameters comprises spatial interpolation parameters;

obtaining data based on a kriging procedure and the set of data augmentation parameters, the data comprising measured data of the first device and augmented data, wherein the kriging procedure estimates missing values based on weighted linear combinations of available neighboring values, the weighted linear combinations computed based on a spatial autocovariance function, and wherein the augmented data comprises radio measurements estimated for locations not measured by the first device; and training the positioning model based on a combination of the measured data and the augmented data, wherein the measured data has a higher weight than the augmented data, and wherein a probability value is associated per augmented data point or per augmented segment indicating a likelihood of accuracy of the augmented data compared to the measured data.

14. The first device of claim 1, wherein the data for training the positioning model includes:

the measured data of the first device;

the augmented data generated by the spatial interpolation technique; and radio measurement data received from a third device.

15. The first device of claim 14, wherein the radio measurement data from the third device indicates one or more of: a reference signal received power, a channel impulse response, an angle of arrival, an angle of departure, a time difference of arrival, or a round trip time; and wherein the set of data augmentation parameters are tuned by minimizing an error between interpolated data generated by the spatial interpolation technique and the radio measurement data from the third device.

16. The first device of claim 1, wherein the assistance request is transmitted together with a capability of the first device in a long term positioning protocol message, the capability comprising at least one of: one or more supported models of the first device, memory resources of the first device, or computational resources of the first device.

17. The first device of claim 16, wherein the assistance request is transmitted in response to a determination that a current dataset of the first device does not enable model training with a required accuracy, the required accuracy being based on at least one of: a positioning accuracy key performance indicator, one or more intermediate KPIs related to an intermediate model used for line-of-sight or non-line-of-sight classification, or a positioning latency of the first device.

18. The first device of claim 1, wherein the spatial interpolation technique comprises a kriging procedure, and wherein the kriging procedure estimates missing values based on weighted linear combinations of available neighboring values, the weighted linear combinations computed based on a spatial autocovariance function.

19. The second device of claim 9, wherein the configuration of data augmentation indicates:

the one or more parameters associated with the spatial interpolation function;

a validity period of the configuration of data augmentation, the validity period expressed as a number of subframes starting from a time the configuration is received at the first device;

an indication regarding whether data for training the positioning model is interpolated or measured; and a dimension of the data for training the positioning model, the dimension being temporal or spatial.

20. The first device of claim 15, wherein:

the second device comprises a network device implementing a location management function;

the third device is within a surrounding area of the first device;

the assistance request is transmitted in response to the first device newly joining a network of the second device;

the configuration of data augmentation further indicates a dimension of the data for training the positioning model, the dimension being temporal or spatial; and in response to feedback information indicating that an achieved interpolation accuracy at the first device is below a threshold value, the second device increases a region to collect radio measurements from neighbor devices.

* * * * *